No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 1.

Witnesses:

Inventor
Arthur Gréaud
By James L. Norris.
Atty.

No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 2.

Witnesses:

Inventor
Arthur Gréaud
By James L. Norris.
Atty

THE NORRIS PETERS CO., PHOTO-LITHO., WASHINGTON, D. C.

No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 3.

Fig. 10.

Witnesses:

Inventor
Arthur Gréaud
By James L. Norris.
Atty.

No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 5.

Fig. 12.

Witnesses:

Inventor
Arthur Gréaud
By James L. Norris
Atty

No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 6.

Witnesses: Inventor
Arthur Gréaud
By James L. Norris
Atty.

No. 750,052. PATENTED JAN. 19, 1904.
A. GRÉAUD.
LAMB KNITTING MACHINE.
APPLICATION FILED MAR. 22, 1901.
NO MODEL. 10 SHEETS—SHEET 10.

Witnesses:
N. L. Bogan
F. R. Ennen

Inventor
Arthur Gréaud
By
James L. Norris.
Atty.

No. 750,052.

Patented January 19, 1904.

UNITED STATES PATENT OFFICE.

ARTHUR GRÉAUD, OF ANGERS, FRANCE.

LAMB KNITTING-MACHINE.

SPECIFICATION forming part of Letters Patent No. 750,052, dated January 19, 1904.

Application filed March 22, 1901. Serial No. 52,432. (No model.)

*To all whom it may concern:*

Be it known that I, ARTHUR GRÉAUD, a citizen of the Republic of France, and a resident of Angers, Maine-et-Loire, in the Republic of France, have invented certain new and useful Improvements in Lamb Knitting-Machines for Tubular Seamless Knitting, of which the following is a specification.

This invention relates to improvements in knitting-machines, and is adapted to produce with great safety and regularity a tubular two-faced fabric and also two tubes, one within the other, in plain work. These two tubes of plain work have their faces on the outside for the outer tube and on the inside for the inner tube and serve principally to constitute the welts or double tops of hose and half-hose or of socks and stockings. These fabrics, both ribbed and plain, can be fashioned—*i. e.*, narrowed and widened—in the same manner as the goods hitherto produced on the old Lamb knitting-machine.

The objects of my improvement are, first, to provide above the usual strongly-inclined machine-needle beds four less inclined counter-needle beds, two on the front and two on the rear side of the machine, and so placed that the one front counter-needle bed is in the same plane as the one rear counter-needle bed and both form a pair, and the two other counter-needle beds forming equally a pair are also in one and the same plane, the two said planes crossing each other in about the same horizontal line as the planes of the two inclined machine-needle beds, this line being hereinafter called the "crossing line;" second, to provide four sets of peculiarly-shaped jacks in said four counter-needle beds and arranged to be operated by locks in a similar manner as the two sets of machine-needles in the usual machines are moved by their respective locks; third, to provide two sets of counter-needles having each a hook and a latch on the one end and a hook on the other end and to so arrange them that the needles of each set may traverse from their one bed to the other bed, and vice versa; fourth, to provide covers on the said four counter-needle beds for guiding the said jacks and limiting their movements toward the crossing line and allowing them to tilt upward near the crossing line, so as to engage or to release the hooks of the counter-needles; and, fifth, to provide on the operating-slide beside the usual locks for operating the two sets of machine-needles special locks for operating the said four sets of jacks. I attain these objects by the mechanism illustrated in the accompanying drawings, in which—

Fig. 10$^a$ is a section through the lock 14 on the line R S in Fig. 10. Fig. 17 represents diagrammatically, on an enlarged scale, the formation of the tubular two-faced fabric and will be referred to later on; and Fig. 18 represents diagrammatically, on an enlarged scale, the formation of the welt—*i. e.*, two distinct tubes, one within the other—in plain work and will be referred to later on.

Similar characters of reference refer to similar parts throughout the several views.

Figures 1, 2:
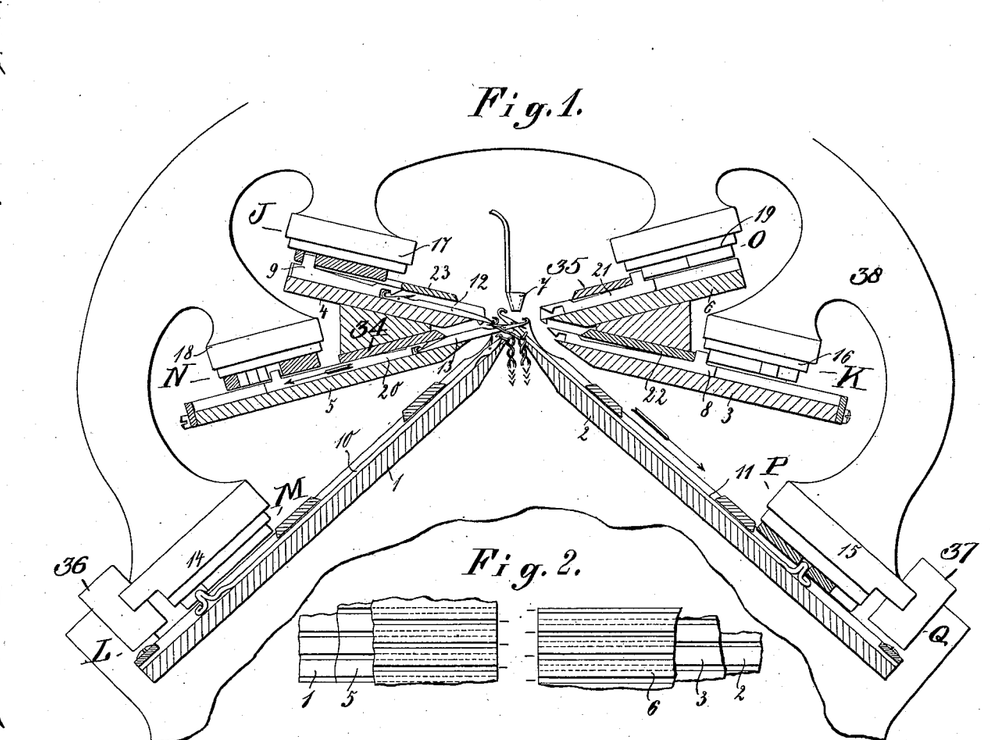
Figure 1 is a cross-section of the machine in which for the sake of clearness all the grooves of the beds are shown in section, although in reality they do not lie in the same plane, but are arranged in different parallel planes, the right-hand side being assumed to be the front side of the machine.
Fig. 2 is a plan of parts of the four counter-needle beds and the two machine-needle beds to show the arrangement of their grooves.
Figure 3:
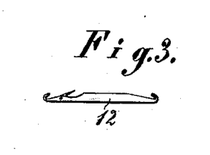
Fig. 3 is an elevation of a counter-needle.

Above the usual needle-beds 1 2, Fig. 1, four counter-needle beds 3, 4, 5, and 6 are secured on the machine-frame in any suitable manner. The beds 3 and 4 forming a pair are on the same plane, which is less inclined than the machine-needle beds 1 2 and crosses in about the crossing line with the plane on which the two other counter-needle beds 5 and 6 are placed. The beds 3 and 5 may be called the "lower" beds and the beds 4 and 6 the "upper" beds. In the grooves of either pair of counter-needle beds the counter-needles 12 (see also Fig. 3) and 13 are arranged to traverse from the lower bed to the upper bed, and vice versa. For this reason the grooves of the lower and the upper bed of either pair are in the same parallel vertical planes. As the front machine-needles 11 are called on to produce with their counter-needles 13 the two-faced fabric, it is evident that the grooves for these two sets of needles must be arranged in different parallel vertical planes, which means that the counter-needles 13 for the front machine-needles 11 must move in the same planes as the rear machine-needles 10, as is indicated by the grooves shown in Fig. 2. This circumstance is the reason why the counter-needles are given the shape shown in Fig. 3. They are made short, so that they can get out of the paths of the machine-needles in the other set when the latter are working.

Figure 4:
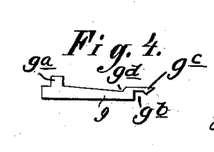
Figs. 4 and 5 show in elevation an upper jack and a lower jack, respectively.
Figure 5:
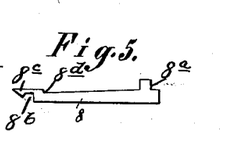
Figure 6:
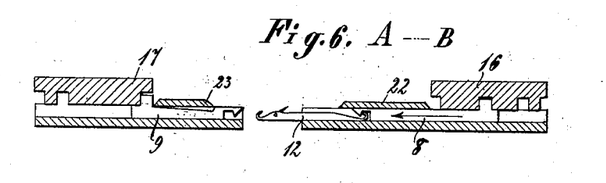
Fig. 6 is a cross-section through a pair of counter-needle beds on the line A B in Fig. 10.
Figure 7:
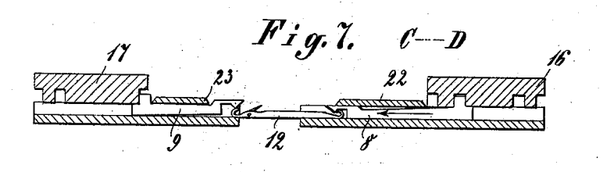
Fig. 7 is a similar cross-section on the line C D in Fig. 10.
Figure 8:
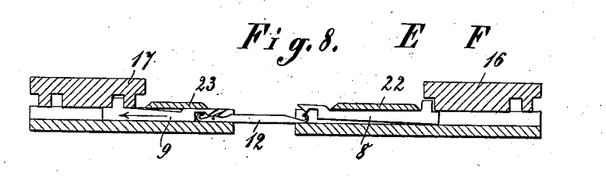
Fig. 8 is a similar cross-section on the line E F in Fig. 10.
Figure 9:
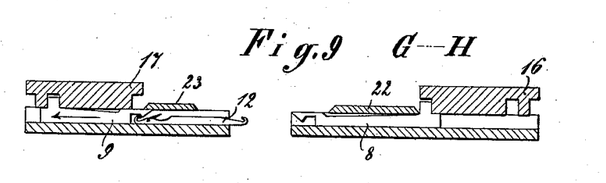
Fig. 9 is a similar cross-section on the line G h in Fig. 10.

The counter-needles 12 13 are each provided with hooks on both ends, but only one latch on the one end. (See Fig. 3.) The hook and the latch on the one end of either counter-needle serve for the same purpose as the hook and latch of either machine-needle—*i. e.*, for seizing the yarn and forming the new loop by knocking over the old loop. The hook on the other end of either counter-needle serves for holding the new loop during the time when the counter-needle is pushed off into the upper bed, and thus put out of the path of the machine-needle in the same plane. Then the latter will be enabled to perform its duty undisturbedly. For traversing the counter-needle from its lower bed to its upper bed, and vice versa, two peculiarly-shaped jacks (shown in Figs. 4 and 5) are employed, which move in the same plane as the counter-needle. The upper jack 9 or 21 is preferably made shorter than the lower jack 8 or 20. Each jack is provided on the one end with a butt, ($9^a$ or $8^a$ in Figs. 4 and 5,) by which it is moved or operated by the respective lock to be mentioned hereinafter. From the butt the jack tapers to a certain point ($9^d$ or $8^d$ in Figs. 4 and 5) near the other end, beyond which it is as high as at the butt. The other end ($9^c$ or $8^c$, respectively) is formed somewhat like a hook projecting downward and having two oppositely-inclined faces, the inner of which terminates in a recess. ($9^b$ or $8^b$ in Figs. 4 and 5.) This recess is about as high as the hook of the counter-needle, and the hook ($9^c$ or $8^c$) of the jack terminates at a certain height above the bottom side of the jack, so as to allow of the hook of the counter needle being lodged in the recess ($9^b$ or $8^b$) when the bottom of the jack rests on that of the bed-groove. (See Figs. 6 and 7 on the right and Figs. 8 and 9 on the left.) Above the counter-needle beds 3 4 5 6, Fig. 1, the covers 22 23 (see also Figs. 6 to 9) 34 35, respectively, are mounted for guiding the jacks. These covers are given about the same width as the tapering parts of the respective jacks are long. It will then be evident that when the one jack—for example, 9 in Fig. 6—is moved by its lock 17 so far that its butt $9^a$ strikes against the edge of the cover 23 the jack will be at liberty to tilt or move with its hook $9^c$ upward. (See Fig. 7.) When at this moment the other jack 8 is moved forward by its lock 16 and pushes the counter-needle 12 forward, the left hook of the latter will strike against the inclined face of the hook $9^c$, raise the latter, and enter the recess $9^b$, whereupon the hook $9^c$ will again drop and snap behind the hook of the counter-needle. If now the jack 9 is withdrawn by its lock 17, the right edge of the cover 23 will prevent the jack-hook $9^c$ from again jumping, so that the jack 9 will take along with it the counter-needle. (See Figs. 8 and 9.) The right hook of the counter-needle will strike against the inner inclined face of the hook 8ᶜ of the jack 8, the butt 8ᵃ of the latter will at this moment rest against the right edge of the cover 22. The consequence of this will be that the hook 8ᶜ of the jack 8 will be lifted, and thus release the counter-needle. (See Figs. 8 and 9.) It will be understood that on moving the counter-needle 12 in the opposite direction similar occurrences will take place. The jacks 21 22 and the counter-needles 13 are similarly operated by their locks 18 and 19, respectively.

In correspondence with the four counter-needle beds the operating-slide 38, which is moved in suitable guides 36 37 by the known reciprocating means, may be provided with suitable projections, on which the locks 16, 17, 18, and 19 are secured in a similar manner as the ordinary well-known locks 14 and 15 for the machine-needles 10 and 11. The operating-slide 38 is provided with the usual yarn-guide 7 and an additional yarn-guide 33 to be mentioned hereinafter; also with the usual and well-known sector-shaped or other devices for shifting the latches of the machine-needles and the counter-needles. These devices are omitted from the drawings, as they form no part of the present invention.

Figure 10:
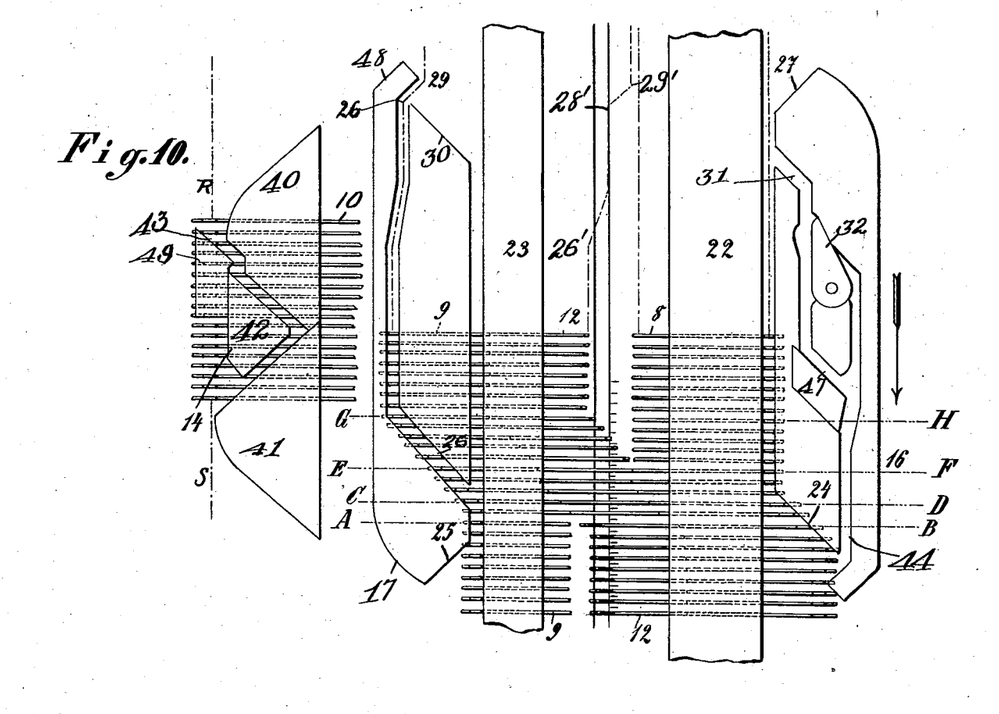
Fig. 10 represents two longitudinal sections on the lines I K and L M in Fig. 1, these sections being assumed to be in the same plane to show the manner in which the counter-needles for the machine-needles on the left—*i. e.*, the rear side of the machine—can be traversed into the upper bed.
Figure 10A:
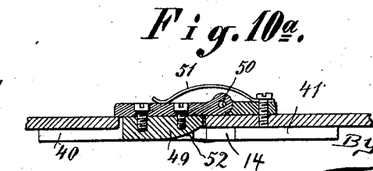
Figure 11:
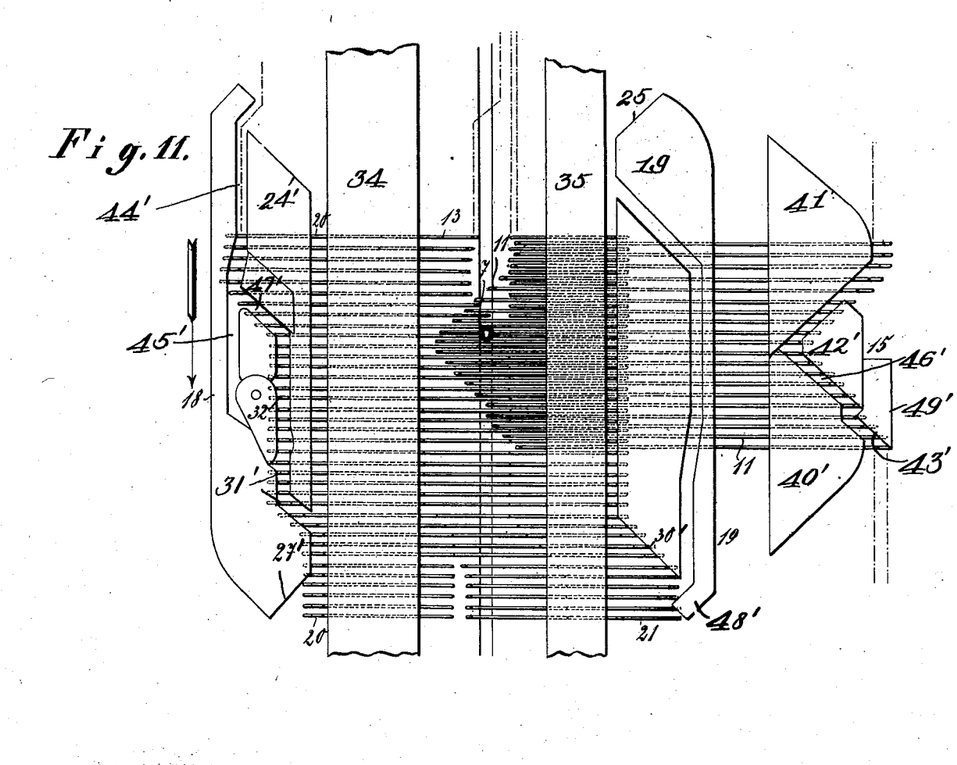
Fig. 11 represents two longitudinal sections on the lines N O and P Q in Fig. 1, these sections being assumed to be in the same plane to show the relative positions of the other set of machine-needles on the right—*i. e.*, the front side of the machine—and their counter-needles when producing the front row of loops in the two-faced tubular fabric.
Figure 12:
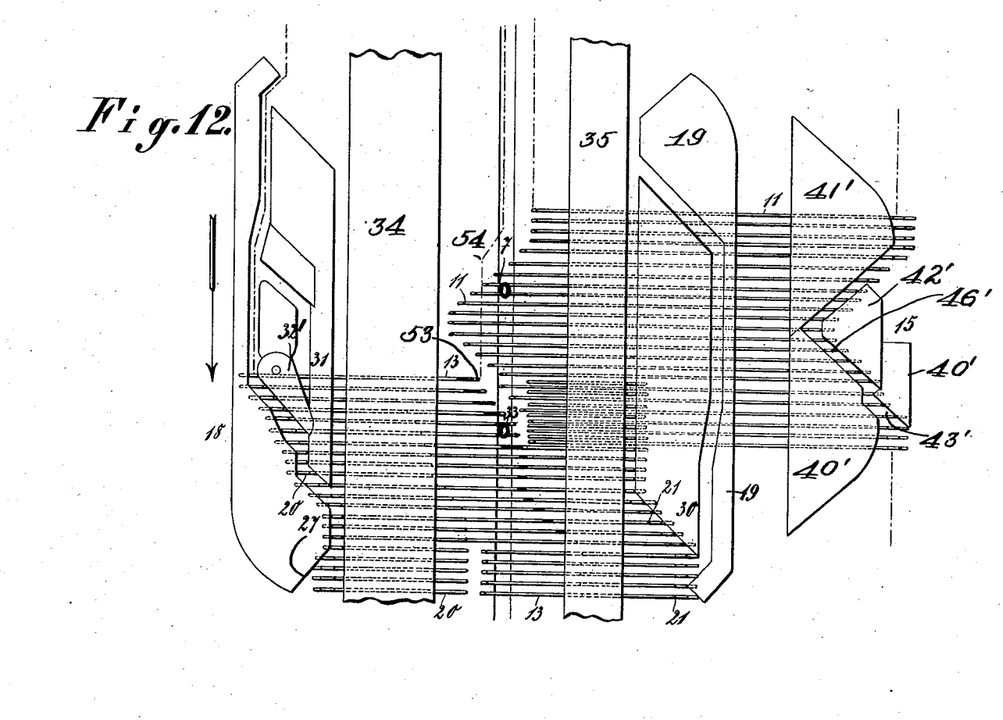
Fig. 12 represents the same two longitudinal sections as before to show the relative positions of the machine-needles and the counter-needles when producing the front part of the two tubes or the welt in plain work.

The locks 14 and 15 of the machine-needles are of the ordinary well-known construction and shown in Figs. 10 to 12. The lock 14 (see Figs. 10 and 10ᵃ) comprises two depressing-cams 40 41 and two raising-cams 42 49. The depressing-cam 41 serves for regulating the length of the loops, as usual. The raising-cam 49 is mounted on a pin 50 to turn and is pressed downward by a spring 51. It is provided with an inclined face 43 for raising the butts of the machine-needles and with an inclined face 52 on the under side. The other lock 15 (see Figs. 11 and 12) is similar to the lock 14, and its parts are marked with the same characters of reference, but with the addition of the index 1. When in Fig. 10 the operating-slide 38 is assumed to move in the direction of the arrow, the butts of the rear machine-needles 10 will strike against the inclined face 52 of the raising-cam 49 and to raise the latter. The consequence of this is that the butts are allowed to pass under the cam 49 and the rear machine-needles remain idle. When, however, the operating-slide moves in the opposite direction, the butts of the rear machine-needles will strike against the inclined face 43 of the raising-cam 49 and be moved thereby and by the raising-cam 42 and the depressing-cam 41 through the channel 46 in a similar manner, as is shown in Fig. 11. Thus only the rear machine-needles will work when the operating-slide moves from left to right, while only the front machine-needles work when the operating-slide returns from right to left.

The locks 16 and 17 of the lower and upper counter-needle beds 3 and 4, respectively, are shown in Fig. 10. It will be seen that the lock 17 for the upper jacks 9 has a short inclined face 25, a long inclined face 30, a projection 48, and but one channel 26 of the shape shown. The lock 16 for the lower jacks 12 is similarly shaped; but it is provided with a second channel 45 beside the channel 31 47 44 and also with a switch 32. The inclined face 24 of the lock 16 is so placed with regard to the channel 26 in the other lock 17 that the channel 26 is enabled to guide the butts of the upper jacks 9 after the latter have been pushed upward by the lower jacks and the counter-needles. On examining Fig. 10 it will be seen that on the operating-slide 38 moving in the direction of the arrow the butts of the lower jacks 8 will strike against the inclined face 24 and be moved thereby upward. Each jack 8 pushes forward its counter-needle 12 until in the position shown between the lines C D and A B. The upper hook of the counter-needle 12 strikes against the hook of the upper jack 9, lifts it and engages its recess. The lower jack 8 will then push farther the counter-needle 12 and the upper jack 9, so that the butt of the latter enters the channel 26 before the butt of the jack 12 strikes against the edge of the cover 22. At this moment the lower jack 8 releases the counter-needle 12, which moves farther upward, while the lower jack retains henceforward its position, as is indicated by the dotted lines. Owing to the shape of the channel 26 and the projection 48, the upper jack 9, with the counter-needle 8, will be again lowered a little and by degrees, as is indicated by the dotted lines 26′, 28′, 29′, and 28 29. The inclined face 30 of the lock 17 is similarly disposed with regard to the channel 31. It is evident that on the operating-slide 38 moving in a direction opposite to that of the arrow the butts of the upper jacks 9, which then occupy the position 29, will strike against the inclined face 30 and be thereby moved downward. The upper jacks 9 push the counter-needles 12 downward until the latter strike against and engage with the lower jacks 8, when the butts of the latter will have entered the channel 31 and pass the part of the same which is parallel to the crossing line or the cover 22. When the switch 32 occupies the position shown, the upper jacks, the counter-needles, and the lower jacks remain henceforward idle and connected until the butts of the lower jacks 8 strike against the inclined face 47, when the counter-needles 12 will be released by the upper jacks 9. During the passage of the butts of the lower jacks through the channel 44 the lower jacks, with the counter-needles, will be moved downward and then again a little and by degrees upward. When, however, the switch 32 occupies the opposite position, the consequence will be that the lower jacks, with the counter-needles, will be moved downward earlier than before. The inclined face 25 of the lock 17 serves for pushing against the edge of the cover 23 the nose of any upper jack 9 that may have been accidentally shifted. The inclined face 27 of the lock 16 serves for a similar purpose.

The locks 18 and 19 of the lower and upper counter-needle beds 5 and 6, respectively, are shown in Figs. 11 and 12. They are similar to the locks 16 and 17 described before and do not require any further explanation.

Figure 17:
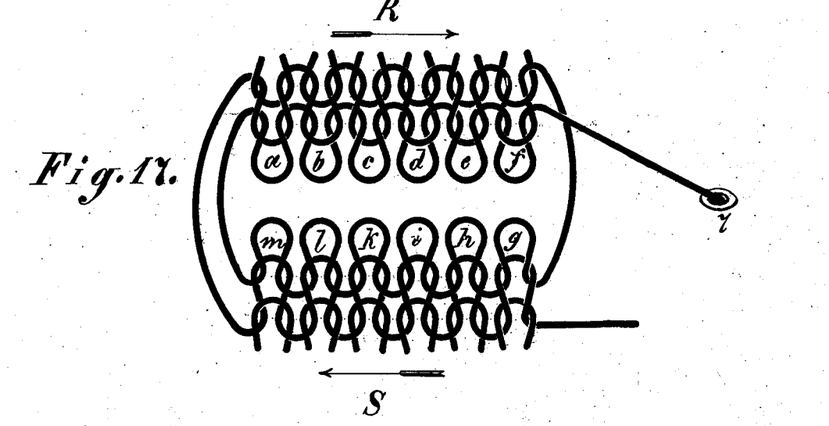
Figure 18:
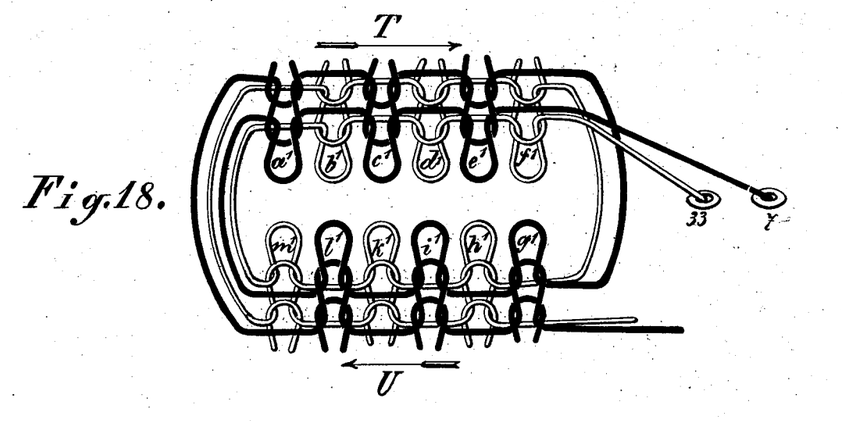

The formation of a tubular two-faced fabric on the new machine is diagrammatically shown in Fig. 17 on an enlarged scale. For the sake of clearness the rear part of the fabric is assumed to be separated, turned upward, and placed in the same plane as the front part, while the loops connecting the two parts on both sides are shown as lengthened. In a similar manner the formation of the welt—i. e., two distinct tubes (one within the other) in plain work is shown in Fig. 18. The external tube is denoted by the black thread with the loops $a'$ $c'$ $e'$ $g'$ $i'$ $l'$ and the internal tube by the white thread with the loops $b'$ $d'$ $f'$ $h'$ $k'$ $m'$. In both figures the external loops $a$ $c e g i l$ and $a'$ $c'$ $e'$ $g'$ $l'$ $i$, respectively, are formed by the usual machine-needles 10 and 11 in Fig. 1 and the internal loops $b d f h k m$ and $b'$ $d'$ $f'$ $h'$ $k'$ $m'$, respectively, by the counter-needles 12 and 13.

For producing a tubular ribbed fabric according to Fig. 17 a single yarn is guided by the yarn-guide 7 in the direction of the arrow R, when the rear machine-needles and their counter-needles will form from it the row of loops in the rear part. Afterward the yarn-guide 7 is moved in the direction of the arrow S, when the front machine-needles and their counter-needles will form from the yarn the row of loops in the front part of the fabric.

For producing a welt in plain work, as per Fig. 18, two separate yarns are used, of which the one, here the white yarn, guided by the yarn-guide 33 is first knitted by the counter-needles alone, which appertain to the rear machine-needles and the black yarn guided by the yarn-guide 7 and following immediately the white yarn is knitted by the rear machine-needles alone, the cams and thread-guides being moved in the direction of the arrow T. When the two yarn-guides 7 and 33 are changed and moved with the operating-slide from right to left, the white yarn will be knitted by the counter-needles alone, which appertain to the front machine-needles and the black yarn by the latter needles alone in the direction of the arrow U. Thus after two movements of the operating-slide one inner circular row of loops is worked by all the counter-needles and one outer circular row of loops by all the machine-needles.

It should be remarked that when the machine is to produce tubular goods with a welt—say a sock or stocking—always the welt is to be commenced by knitting it in plain work with two yarns—for example, the external tube with the black yarn guided by the yarn-guide 7 and the internal tube with the white yarn guided by the yarn-guide 33, and afterward the sock or stocking is further knitted in ribbed fabric according to Fig. 17 with a single yarn, the guides 33 being withdrawn and the locks adjusted accordingly and as shown in Fig. 11.

Figure 13:
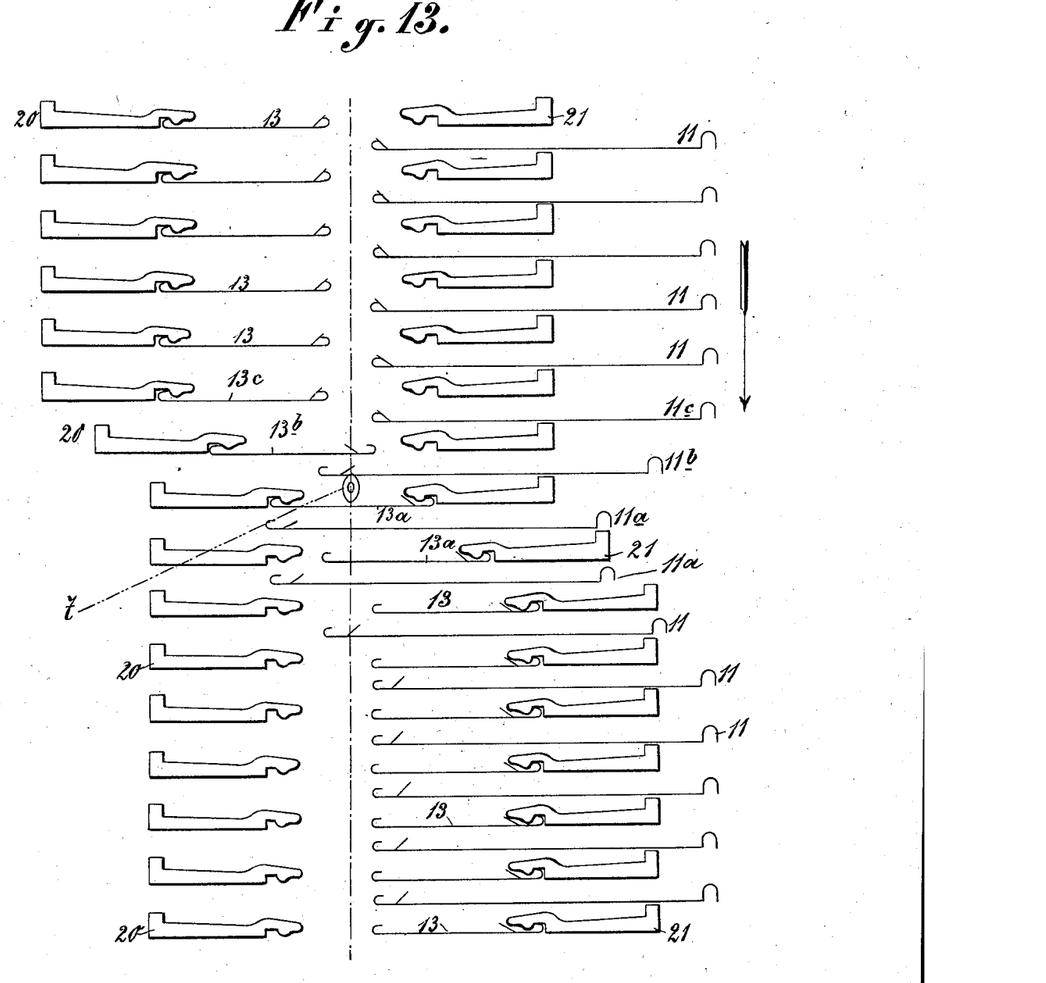
Fig. 13 represents diagrammatically the relative positions of the machine-needles on the right—*i. e.*, the front side of the machine—their counter-needles, and the appertaining jacks for producing the front row of loops in a tubular two-faced fabric during the movement of the operating-slide in the direction of the arrow.
Figure 14:
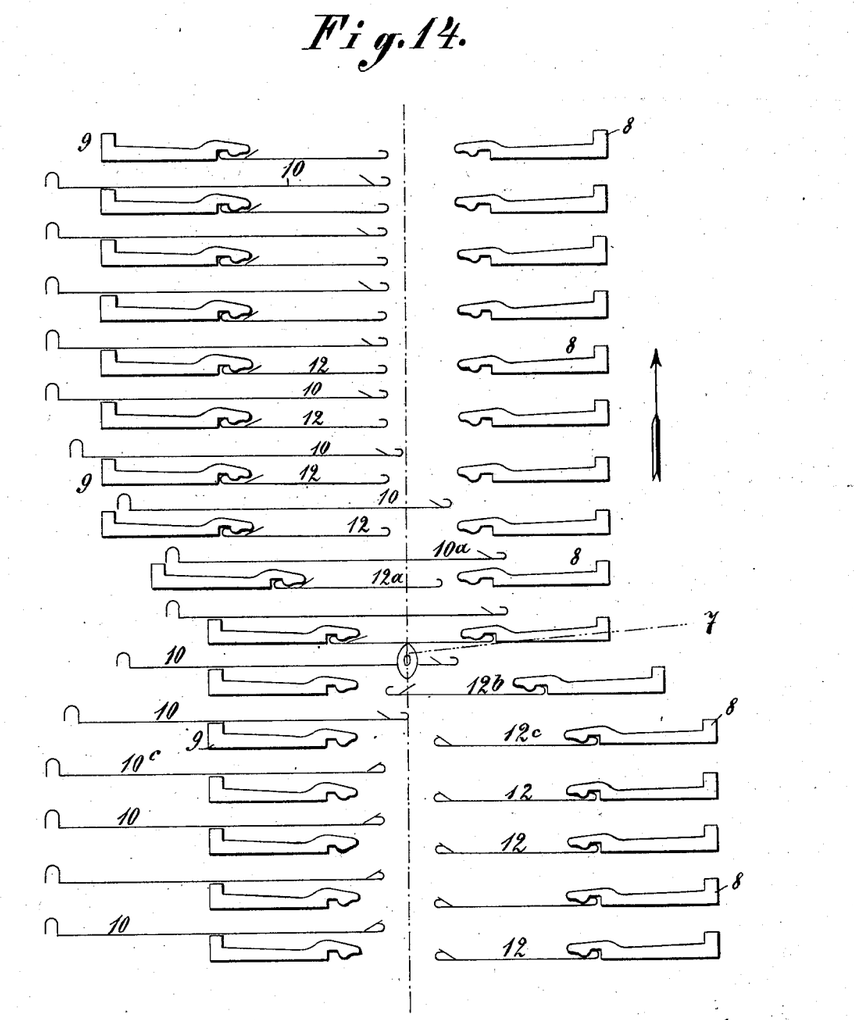
Fig. 14 represents diagrammatically the relative positions of the machine-needles on the left—*i. e.*, the rear side of the machine—their counter-needles, and the appertaining jacks for producing the rear row of loops in the tubular two-faced fabric during the movement of the operating-slide in the direction of the arrow.
Figure 15:
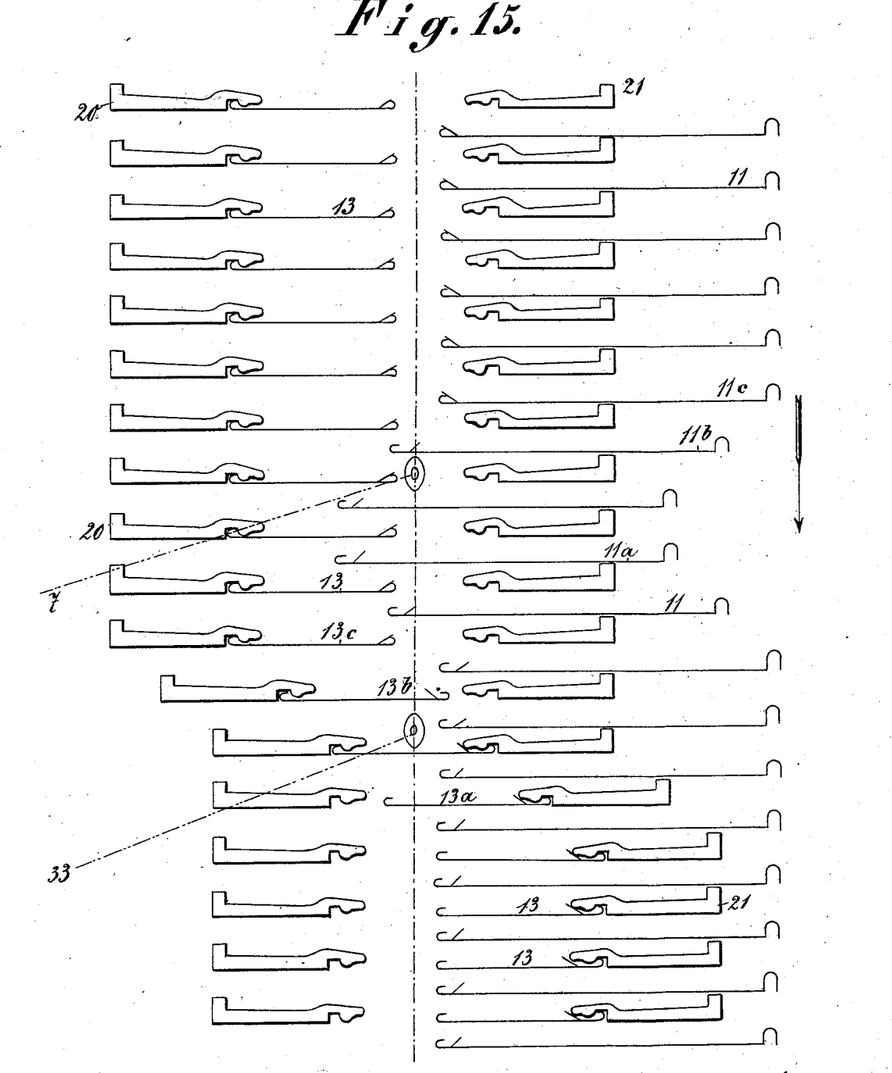
Fig. 15 represents diagrammatically the relative positions of the machine-needles on the right—*i. e.*, the front side of the machine—their counter-needles, and the appertaining jacks for producing the loop-rows in the front part of the two tubes or the welt in plain work during the movement of the operating-slide in the direction of the arrow.
Figure 16:
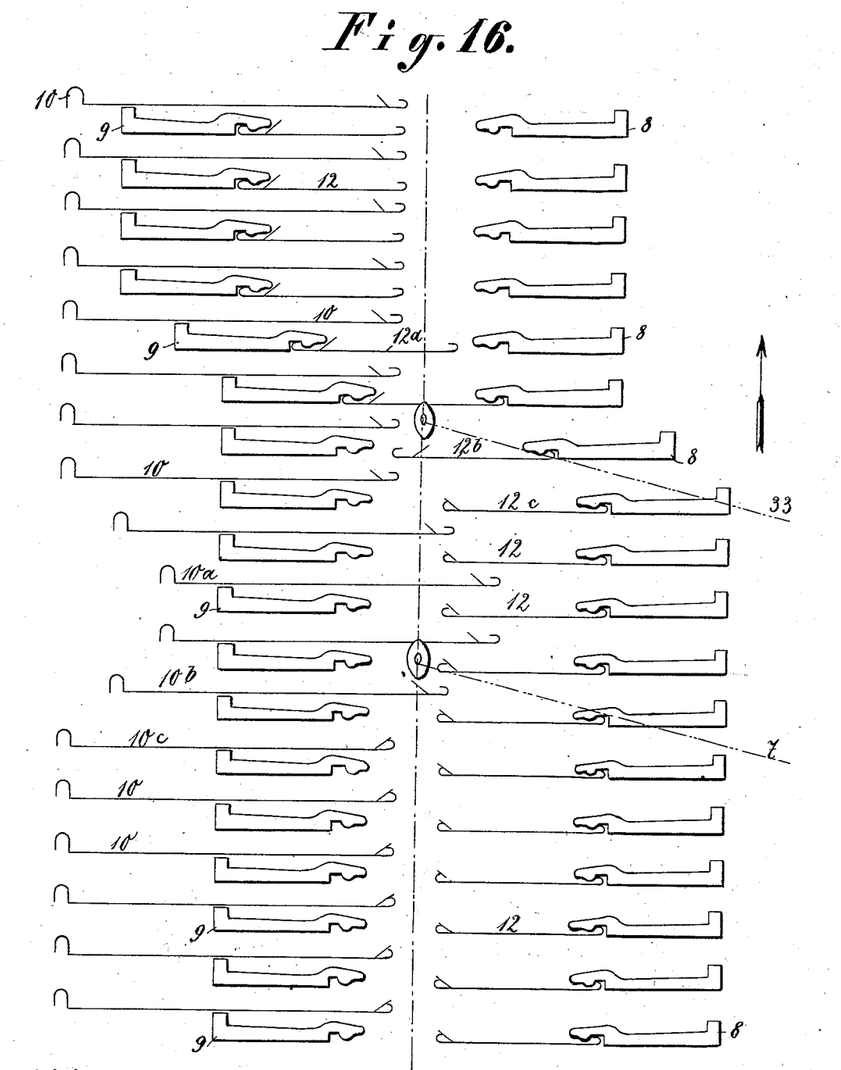
Fig. 16 represents diagrammatically the relative positions of the machine-needles on the left—*i. e.*, the rear side of the machine—their counter-needles, and the appertaining jacks for producing the loop-rows in the rear part of the two tubes or the welt in plain work during the movement of the operating-slide in the direction of the arrow.

The tubular ribbed fabric is knitted in the following manner: The operating-slide 38 is first assumed to move from right to left in the direction of the arrow in Fig. 11. The counter-needles 13 being still in the upper bed 6 are traversed to the lower bed 5 under the action of the lock 19, as explained above. The latches of the front machine-needles 11 are opened or shifted downward by the respective device on the operating-slide, after which these machine-needles are moved so much upward by the raising-cams 49' and 42' that the old loops slide over the latches under the action of the usual web-holders, as is shown in Fig. 1. The relative positions of the various counter-needles and machine-needles are represented diagrammatically in Fig. 13, where the machine-needle $11^a$ occupies its uppermost position. When coming under the yarn-guide 7, each machine-needle 11 has sunk back a little, as is shown at $11^b$ in Fig. 13, and is ready for receiving the yarn between its hook and latch. While the operating-slide moves on, this needle further sinks, as it is shown at $11^c$, its latch being closed by the old loop, and the old loop is knocked over the yarn, whereby from the latter a new loop is formed, which is henceforward held by the hook of the machine-needle 11 under the latch. Meanwhile the corresponding counter-needle 13 has been pushed down (see $13^a$ in Fig. 13) and released by its upper jack 21 and occupies below the yarn-guide 7 such a position, $13^b$, (see also Fig. 1,) as to be ready for receiving the yarn between its upper hook and its latch. On being moved farther downward by its lower jack 20 its latch will be closed by the old loop, and the old loop after having slid upward on the counter-needle will be knocked over, whereby from the yarn a new loop is formed, which is henceforward held by the upper hook of the counter-needle 13 under the latch. After finishing its movement to the left the operating-slide is now moved from left to right in the direction opposite to that of the arrow in Fig. 11. First the counter-needles 13 are pushed upward into the upper bed 6, and thus brought out of the paths of the rear machine-needles 10. Meanwhile the new loops have slid over the again-opened latches and down the counter-needles 13 to their lower hooks, by which they are henceforward held. The rear machine-needles 10 and their counter-needles 12 will now knit the rear course of the fabric in a similar manner as described above and also shown in Fig. 14, which requires no further explanation. The welt in plain work is knitted in the following manner: The switches 32 and 32' in the lower locks 16 and 18 are brought into their extreme positions, (indicated in Fig. 12,) so as to enable either set of counter-needles to move in time into their lower beds and leave room for the opposite set of machine-needles, which work in their planes. The two yarn-guides 7 and 33 are employed, which are changed at the end of every stroke by any known means.

The fashioning—i. e., widening and narrowing—of the fabrics is carried out on this machine in the same manner as on the usual Lamb knitting-machine; but care should be taken that only the fabric loops on needles of that set which has just worked be transferred and not the loops on needles of the other set, which is at rest. For instance, if the ribbed fabric is to be narrowed and the operating-slide 38 has arrived at the left-hand end the front machine-needles 11 and the counter-needles 13 are those which have just worked and hold the new loops in their hooks under the latches. By means of a transferring-hook the loop on the last machine-needle 11 on the right is taken off and transferred to the last needle but one, after which the free needle 11 is withdrawn downward by hand. In the same manner the loop on the last counter-needle 13 on the right is transferred to the last but one, after which the free counter-needle 13 is withdrawn downward by hand with the assistance of its lower jack 20. Now the other course of the fabric requires to be narrowed. For this purpose the operating-slide is moved from left to right when the machine-needles 10 and the counter-needles 12 are those which have just worked. Now the loop on the last machine-needle 10 on the right is transferred to the last but one, after which the free machine-needle is withdrawn downward by hand. Then the loop on the last counter-needle 12 on the right is transferred to the last but one, after which the free counter-needle is withdrawn by hand with the assistance of its lower jack 8, and thereby a narrowing operation is completed. The only difference between this machine and the usual Lamb's knitting-machine with regard to the fashioning of the fabric is that the narrowing or widening is carried out on four needle-sets instead of two.

The two sets of short counter-needles with lower and upper jacks working in separate lower and upper beds above the usual machine-needle beds according to my invention afford the important advantage that the pitch of all the needle-grooves can remain alike and the same as in the old Lamb's knitting-machine, so that the counter-needles can be made as strong as the machine-needles. A further important advantage is that the counter-needles receive each but one new loop, so that it is impossible to give the loops any length without danger of the yarn or the new loop being drawn through two old loops. Moreover, the narrowing of the fabric is thereby extremely facilitated, since there is not danger of transferring two loops at one time with the tickler.

What I claim as my invention, and desire to secure by Letters Patent, is—

1. In a knitting-machine for tubular seamless knitting, two sets of machine-needles, beds therefor, two sets of counter-needles, a pair of beds for each set of counter-needles arranged above the beds of the machine-needles, means mounted in counter-needle beds for causing the traversing of the counter-needles from one of their beds to the other, and operating means for said traversing means.

2. In a knitting-machine for tubular seamless knitting, two sets of machine-needles, beds therefor, two sets of counter-needles arranged above said machine-needles, a pair of beds for each set of counter-needles, means mounted on counter-needle beds for causing the traversing of the counter-needles from one of their beds to the other, and means for alternately operating said machine-needles and said traversing means.

3. In a knitting-machine for tubular seamless knitting, two sets of counter-needles, a pair of beds for each set of counter-needles, the beds of the two pairs being placed one above the other, two sets of machine-needles arranged below said counter-needles, beds for said machine-needles, and means for operating the sets of counter-needles simultaneously and alternately in operation with the remaining sets of needles.

4. In a knitting-machine for tubular seamless knitting, two sets of counter-needles, a pair of beds for each set of counter-needles, the beds of the two pairs being placed one above the other, jacks for said needles, two sets of machine-needles arranged below said counter-needles, beds for said machine-needles, and means for operating said sets of counter-needles simultaneously and alternately in operation with the remaining sets of needles.

5. In a knitting-machine for tubular seamless knitting, two sets of machine-needles, beds therefor, two sets of counter-needles arranged above said machine-needles, each counter-needle having a hook at one end and a hook and a latch at the other end, a pair of beds for each set of counter-needles, the beds of the two pairs being placed one above the other, four sets of jacks sliding in the four counter-needle beds and adapted to engage the hooks of said counter-needles for operating the same, and means for suitably operating said jacks and machine-needles.

6. In a knitting-machine for tubular seamless knitting, a plurality of sets of counter-needles, each needle having a hook at one end and a hook and a latch at its other end, a pair of beds for each set of counter-needles, means adapted to engage the ends of said needles for moving the same into and out of operative position, operating means therefor, a plurality of sets of machine-needles arranged below said counter-needles, and operating means therefor.

7. In a knitting-machine for tubular seamless knitting, two sets of counter-needles, a pair of separate beds for each set thereof, jacks mounted in the said beds and adapted to cause each set of needles to traverse from one bed of the pair of beds to the complementary bed of the pair of beds, two sets of machine-needles arranged below said counter-needles, beds for said machine-needles, and means for suitably operating said machine-needles and jacks.

8. In a knitting-machine for tubular seamless knitting, two sets of machine-needles, beds therefor, two sets of counter-needles arranged above said machine-needles, a pair of beds for each set of counter-needles, means for suitably operating the said machine and counter-needles, and means for guiding yarn to the said needles.

9. In a straight-knitting machine for tubular seamless knitting, two sets of machine-needles, beds therefor, two sets of counter-needles arranged above said machine-needles, each counter-needle having a hook and a latch at one end for seizing the yarn and knocking over the old loop and a hook at the other end for holding the new loop in inoperative position, a pair of beds for each set of counter-needles, the beds of the two pairs being placed one above the other, four sets of jacks sliding in the four counter-needle beds, each jack in the one bed of either of the two pairs of beds being adapted to engage the hook of the counter-needle for operating the same and each jack in the other bed being adapted to engage the other hook of the counter-needle for withdrawing and holding the same in its inoperative position, and means for suitably operating said jacks and machine-needles.

10. In a straight-knitting machine for tubular seamless knitting, two sets of machine-needles, beds therefor, two sets of counter-needles arranged above said machine-needles, each counter-needle having a hook and a latch at the one end for seizing the yarn and knocking over the old loop and a hook at the other end for holding the new loop in inoperative position, a pair of beds for each set of counter-needles, the beds of the two pairs being placed one above the other and the two beds of either pair having needle-grooves in the same parallel planes as the bed-grooves for that set of machine-needles which do not work with the respective counter-needles, four sets of jacks sliding in the four counter-needle beds, each jack in the one bed of either of the two pairs of beds being adapted to engage the hook end of the counter-needle for operating the same and each jack in the other bed being adapted to engage the hook and latch end of the counter-needle for withdrawing and holding the same in its inoperative position and thus permitting the machine-needle in its plane to work, means for suitably operating said jacks and machine-needles, and means for guiding yarn to the said needles.

11. In a straight-knitting machine for tubular seamless knitting, two sets of machine-needles, beds therefor, two sets of counter-needles arranged above said machine-needles, each counter-needle having a hook and a latch at the one end and a hook at the other end, a pair of beds for each set of counter-needles, the beds of the two pairs being placed one above the other and the beds of either pair having needle-grooves in the same parallel planes as the bed-grooves for that set of machine-needles which does not work with the respective counter-needles, four sets of jacks sliding in the four counter-needle beds, each jack in the one bed of either of the two pairs of beds being adapted to engage the hook end of the counter-needle for operating the same and each jack in the other bed being adapted to engage the hook and latch end of the counter-needle for withdrawing and holding the same in its inoperative position and thus permitting the machine-needle in its plane to work, means for guiding yarn to the said needles, means for so operating said jacks and machine-needles, that either set of machine-needles can knit a yarn to produce the external tube of a welt in plain fabric and their counter-needle immediately following can knit another yarn to produce the internal tube of the welt in plain fabric, and means for so operating said jacks and machine-needles, that either set of machine-needles can knit a single yarn with the corresponding set of counter-needles to produce a tubular ribbed fabric.

12. The jack having a butt at the one end and a hook at the other end and projecting downward to a certain height above the bottom side, which hook is provided with two oppositely-inclined faces, of which the external one is adapted to move over and engage the hook end of the counter-needle and the internal inclined face is adapted to move over and release the said hook end, substantially as herein shown and described.

In witness whereof I have hereunto set my hand in presence of two witnesses.

ARTHUR GRÉAUD.

Witnesses:
   GOTELUNÉ PIERRE,
   BARBAUD LOUIS.